United States Patent [19]
Salmon

[11] 4,139,888
[45] Feb. 13, 1979

[54] AUTOADAPTIVE WORKING CENTER FOR PROGRAMMABLE AUTOMATION

[75] Inventor: Mario Salmon, Ivrea (Turin), Italy

[73] Assignee: Ing. C. Olivetti & C., S.p.A., Ivrea (Turin), Italy

[21] Appl. No.: 769,587

[22] Filed: Feb. 17, 1977

[30] Foreign Application Priority Data
Sep. 14, 1976 [IT] Italy .................... 69228 A/76

[51] Int. Cl.² .......................................... G05B 19/18
[52] U.S. Cl. ................... 364/105; 364/107; 364/113; 364/115; 364/120
[58] Field of Search .................. 235/151.1, 151.11; 29/709, 711, 712, 407, 406; 364/105, 107, 113, 115, 120

[56] References Cited

U.S. PATENT DOCUMENTS

| | | | |
|---|---|---|---|
| 3,699,317 | 10/1972 | Middleditch | 235/151.11 |
| 3,920,972 | 1/1975 | Dudley et al. | 235/151.11 |

Primary Examiner—David H. Malzahn
Attorney, Agent, or Firm—Schuyler, Birch, Swindler, McKie & Beckett

[57] ABSTRACT

An autoadaptive working center for programmable automation comprises at least a pair of independently programmable autoadaptive devices adapted to recognize a set of different situations of the working process for addressing a corresponding subroutine of the program. Each device comprises at least a force transducer adapted to sense a wall of the workpiece under the control of a wall search instruction. The working center is also adapted to correlate the movement of the two devices under the control of correlation instructions and anti-collision setting instructions defining the dimensions of the two devices.

13 Claims, 9 Drawing Figures

AUTOADAPTIVE WORKING CENTER FOR PROGRAMMABLE AUTOMATION

BACKGROUND OF THE INVENTION

The present invention relates to a working centre which is autoadaptive under programmable automation.

Equipment is known in the art which is capable of bringing a particular tool over a given position of a workpiece with a certain approximation and of subsequently sensing the workpiece itself in accordance with a predetermined law until it is arrested exactly in the desired position. In another known machine there has also been proposed an autoadaptive tactile device in which the toolholder is provided with sensors which, as a function of the displacement, for example of a pin with respect to a hole, produce a corresponding displacement of the toolholder by means of servomotors. Both these known machines require very sophisticated and costly electronic apparatus for the command of the part.

The object of the present invention is to provide an autoadaptive working centre which obviates the above disadvantages.

SUMMARY OF THE INVENTION

According to the present invention there is provided a working centre wherein a force transducer is adapted to sense a wall of the workpiece disposed along a corresponding path of a programmable autoadaptive device. The program means is arranged to recognize a wall search instruction and to address the following instruction as a function of the result of this search. This invention is an improvement of the basic invention described in copending United States application Ser. No. 717,945 filed on Aug. 26, 1976 now U.S. Pat. No. 4,092,719.

BRIEF DESCRIPTION OF THE DRAWINGS

The invention will be described in more detail, by way of example, with reference to the accompanying drawings, wherein:-

DESCRIPTION OF THE PREFERRED EMBODIMENT

Working centre

The working centre may be briefly described as a system equipped with two operating heads, each with three degrees of freedom, translations X, Y, Z, which are controlled by a single control unit composed of specific electronic hardware, and by a minicomputer.

Figure 1:
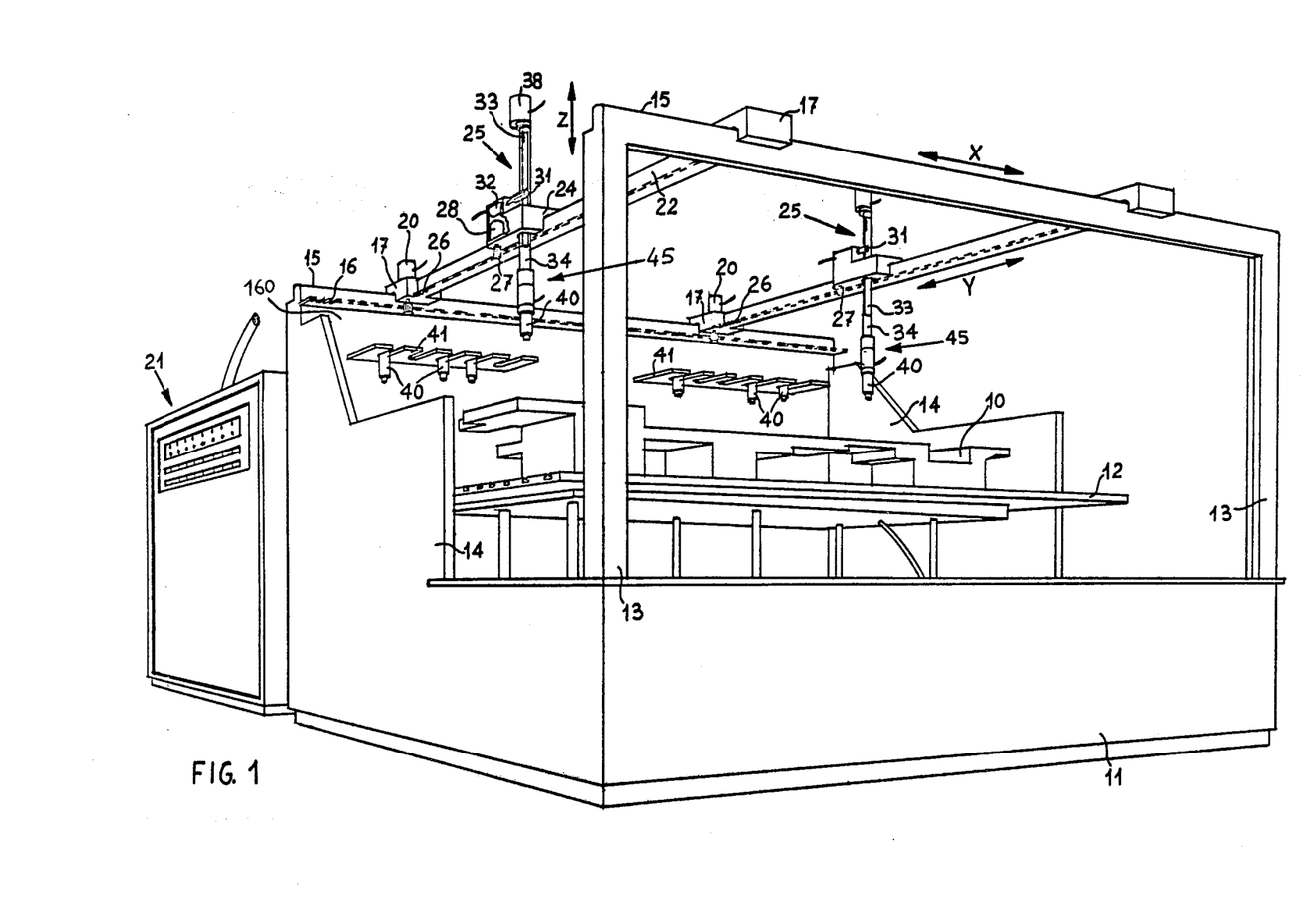
FIG. 1 is a perspective view of a working centre embodying the present invention.

Referring to FIG. 1, the bed 11 of a working centre supports a fixed worktable 12 on which a workpiece or part 10 to be worked is fixed. To the bed 11 there are fixed two pairs of uprights 13 and 14 interconnected by two transverse crosspieces or rails 15. The rear rail 15 bears a fixed rack 16. Two fore-and-aft beams 22 can run along the two rails 15, each of the beams carrying a pinion in engagement with the fixed rack 16 and adapted to be rotated by a stepping motor 20. The ends of the beams are formed as carriages running on the rails 15. Each stepping motor 20 is commanded by a control unit 21 by means of a number of pulses proportional to the movement that the beam must make along the X axis.

Each beam 22 supports a roller-mounted carriage 24 carrying a corresponding operating head 25. Each carriage 24 is moreover provided with a pinion 27 which meshes with a rack 26 fixed to the corresponding beam 22 and is driven by a second stepping motor 28 controlled by the unit 21 for the movement of the operating head 25 along the Y axis.

Each carriage 24 is provided with a third pinion 31 rotated by a third stepping motor 32 which is also controlled by the unit 21. The pinion 31 meshes with a rack 33 formed on a barrel 34 of the working head 25 for the movement of the head along the Z axis. A toolholder 40 is connected removably to the barrel 34.

The changing of the toolholder 40 according to the working operations to be carried out is effected automatically. To this end, on a back wall 160 (FIG. 1) there is mounted a tool rack 41 in which the various toolholders 40 to be used are arranged in predetermined positions. The tool rack 41 may be replaced by a revolving table in which the various tools are arranged so that they can be picked up by the heads 25 from a fixed position.

The setting down of the tool which has worked in its respective position (if necessary the rotation of the table for the search for the new tool), and the picking up of the new tool are controlled in manner known per se.

The toolholder 40 is connected to the operating head 25 by means of a coupling 45 comprising an electromagnet 49 (FIG. 2) having a winding adapted to be energized, under the control of the unit 21, with two different voltages: a first voltage of 8 volts and a second voltage of 24 volts. When the control unit 21 causes the electromagnet 49 to be energized with the voltage of 8 volts, the electromagnet 49 retains the toolholder 40 (FIG. 1) while allowing it a certain radial movement, assisted by a pneumostatic cushion. As soon as the desired position is reached by the toolholder 40, the control unit effects energization of the electromagnet 49 with the voltage of 24 volts, whereby the toolholder 40 remains fixed rigidly to the head 25.

The toolholder of each operating head may be equipped with various tools, such as a cutting tool, for example a drill, or a fitting or assembly tool, for example gripping pincers or a screwdriver. The fitting or assembly tool is provided with a force transducer 97 (FIG. 2) sensitive to the forces acting along the axis Z and with two transducers 126 sensitive to the forces acting along the axis X and Y, as described in copending United States patent application Ser. No. 717,945 filed on Aug. 26, 1976, now U.S. Pat. No. 4,092,719.

The working centre may moreover be equipped for other types of working operations. One of these operations may be the hot riveting of studs or pins to sheet metal parts. The parts to be riveted are carried by a rotary table in order to obtain complete matching of man times and machine times. By employing the same machine with the elimination only of the rotary table, it is also possible to carry out spot welding operations between plane sheets or plates of metal.

The intensity of riveting is regulated by the control unit 21 through the medium of a D/A converter forming an interface with the conventional riveting controls, under the control of special instructions for controlling the intensity of the riveting current and for timing the various stages of the operation Ser. No. 717,945 filed on Aug. 26, 1976.

CONTROL OF THE WORKING CENTRE

The control unit 21 comprises a specific hardware unit 161 of the system (FIG. 2), for the individual drive of the stepping motors 20, 28, 32 of each operating head 25. The hardware unit 161 moreover provides for driving with two different voltages each electromagnet 49 which ensures the autoadaptation of each operating head 25. The hardware unit 161 also provides for controlling other auxiliary functions of the working centre, which may be specific of the type of working operation, such as, for example, the feed of the cutting tool, the closing of the gripping pincers, the welding electrodes, the preheating and riveting units, etc.

Figure 2:
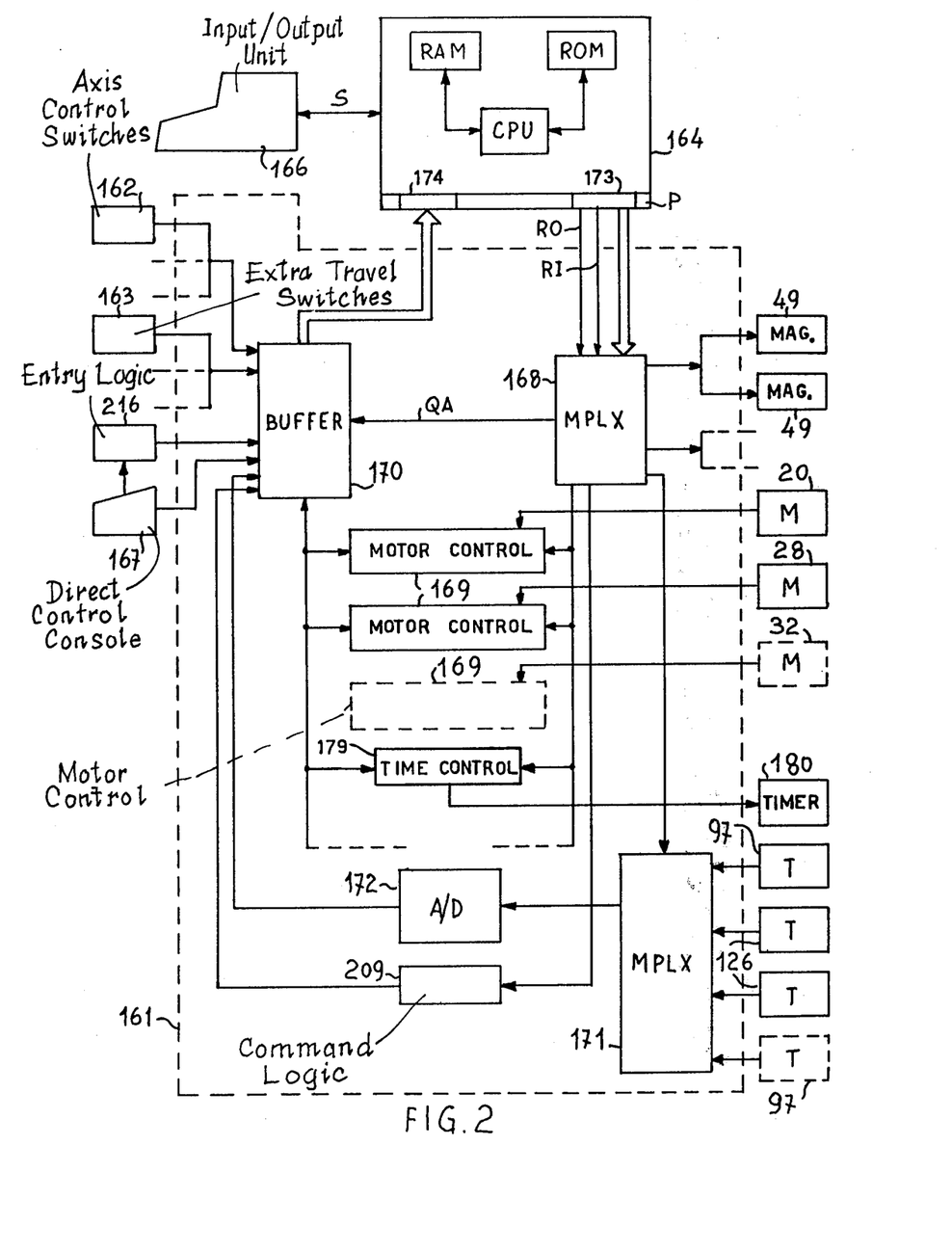
FIG. 2 is a block diagram of the control system of the centre of FIG. 1.

The hardware unit 161 is moreover conditioned by the three force transducers 97, 126 of each operating head and by three axis-control microswitches 162, each of which is associated with one of the three axes X, Y and Z and is closed by the respective head 25 when it is brought into correspondence with the zero of the respective axis. Finally, the unit 161 is conditioned by a series of extra-travel microswitches 163 of the head 25 along the various axes. In FIG. 2 there are shown by way of indication only some of the elements driven by the unit 161.

The unit 161 is driven in turn by a computing unit 164 constituted essentially by a minicomputer, which comprises at least one working memory RAM with a capacity of eight thousand 16-bit words, a read-only memory ROM, a central unit CPU, and a 16-bit parallel interface P for input to, and output from, the unit 161. A serial interface S connects the minicomputer 164 to an input and output unit for data, commands and programs, which is constituted, for example, by a teleprinter 166 comprising in its turn an alphanumeric keyboard, a printing unit, a tape punch and a punched tape reader. Finally, the system comprises a console 167 which allows direct control of a number of functions of the unit 161, as will be seen better hereinafter.

More particularly, the unit 161 comprises a multiplexer 168 for data received, that is data from the computing unit 164, this multiplexer providing for decoding the various instructions received from the computing unit 164 in order to distribute them to the various utilizing units, motors, transducers, auxiliary controls, etc. The unit 161 moreover comprises for each motor a corresponding control circuit 169 adapted to define both the speed and the movement to be commanded along the respective axis. As will be seen better hereinafter, each circuit 169 is adapted to generate an arrival signal of the respective motor, which is sent to a buffer 170, this buffer being for transmission or input to the computing unit 164. The buffer 170 moreover receives the end-of-travel signals of the controls of the console 167 and the signals received by a multiplexer 171 for analogue data, which are converted into 8-bit digital signals by an A/D converter 172. The analogue data is supplied by the transducers 97, 126 selected from time to time by the computing unit 164 through the multiplexer 168.

Between the multiplexer 168 and the buffer 170 there are moreover arranged two control circuits 179 for two timers 180, which are used to define the duration of certain operations of each head 25, for example the preheating in hot riveting. The multiplexer 168 is moreover connected to the buffer 170 to allow the signalling of acceptance of the data sent by the minicomputer 164 by the various destination units.

The minicomputer 164 carries out conversations with the unit 161 through two 16-bit terminal boards, one 173 for reception of the data by the multiplexer 168 and the other 174 for transmission of the data from the buffer 170. The reception-transmission conversation is supervised by the minicomputer 164 via two terminals RI and RO associated with the terminal board 173. When the terminal RI is energized (RI=1), it prearranges the unit 161 for reception of data from the minicomputer 164, while when it is deenergized (RI=0) it prearranges the minicomputer 164 to receive the signals transmitted by the unit 161. When the terminal RO is energized (RO=1), the start command is given to the unit 161 for reading the signals from the terminal board 173. Therefore, the format of each instruction sent by the minicomputer 164 to the unit 161 presents two signals RO and RI (FIG. 3) and a group of sixteen bits 0-15.

The multiplexer 168 comprises a group of gates 175 (FIG. 4b) which permit interfacing the signals from the minicomputer 164, a clock source CK which cycles continuously at a frequency of 10 KHz, a storage and decoding register 176 adapted to decode the bits 11-14 of each instruction to generate eight different functions FU0-FU7, and a counter 177 capable of counting by fours, or by threes + three under the control of the clock and on reception of a sequence of the release signals RI and RO from the minicomputer.

Figure 5:
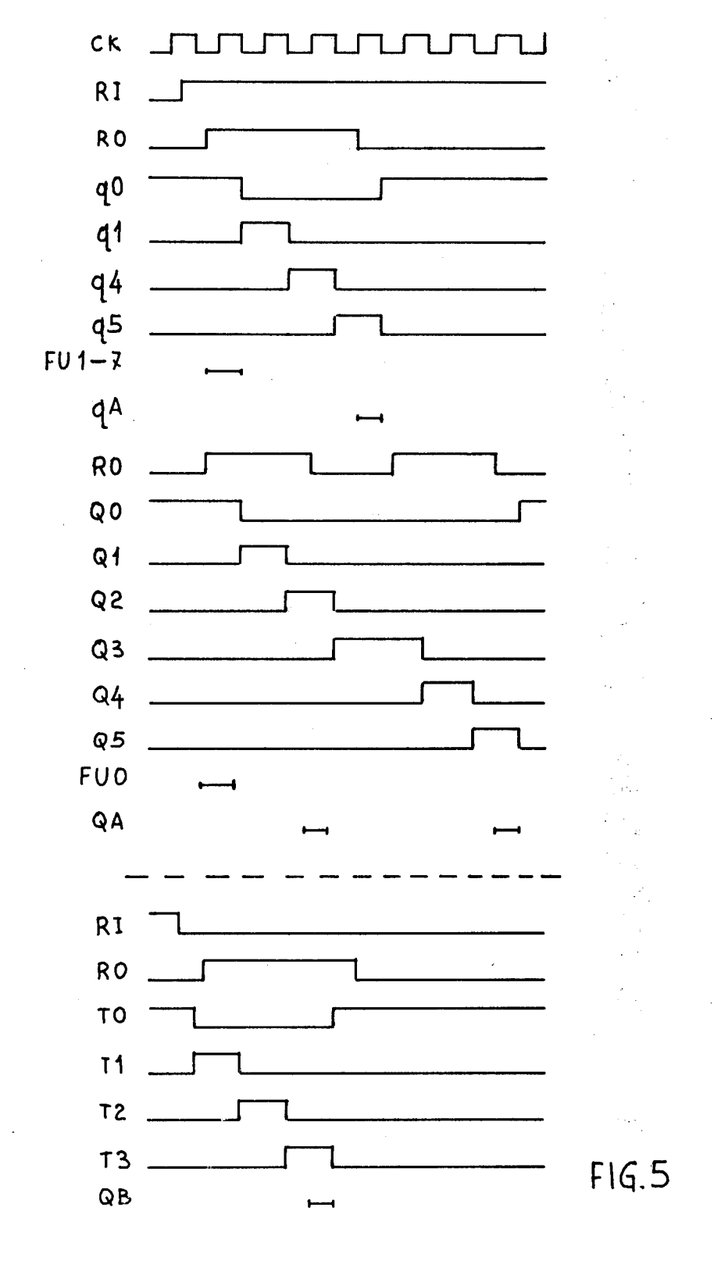
FIG. 5 is a diagram of a number of functions of the hardware unit.

The counter 177 counts by fours when the functions FU1-FU7 are decoded and counts by threes + three when the function FU0 is decoded, as indicated by the signal RO in the diagram of FIG. 5. In the first case, the signals q0, q1, q4 and q5 and qA are generated, in the second case the signals Q0, Q1, Q2, Q3, Q4, Q5 and QA are generated.

Figure 3:
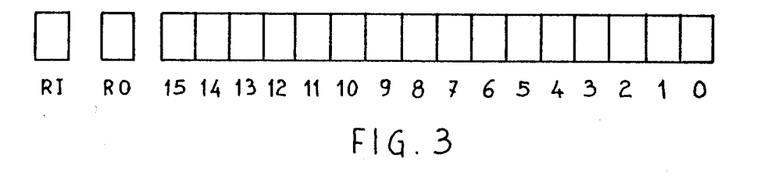
FIG. 3 is a diagram of an instruction in machine language of the system of FIG. 2.

The function FU0 indicates the selection of one of the six motors 20, 28, 32 and of two timers 180 and prearranges the reception of two instructions by the unit 161. The first instruction comprises the code of the function FU0 and the address of the motor or of the timer given by the bits 0-3 (FIG. 3). This address is stored in a register 178 (FIG. 4b) of the multiplexer 168 at the instant Q1 (FIG. 5) while the register 178 (FIG. 4b) is prearranged for the storage of the second instruction.

Figures 4, 4A:
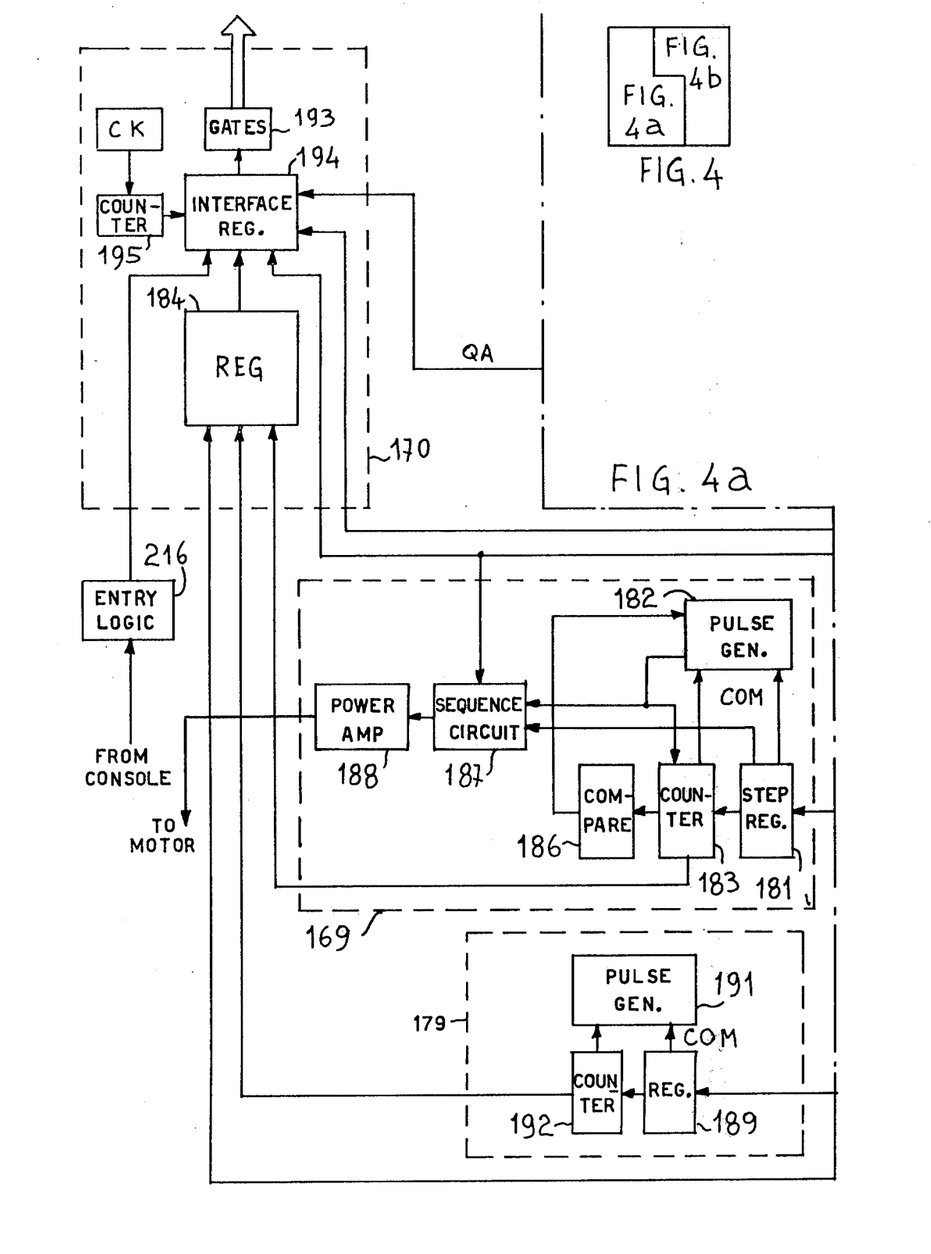
FIGS. 4a and 4b, assembled as in FIG. 4, are detailed diagrams of the hardware unit of the system of FIG. 2.
Figure 4B:
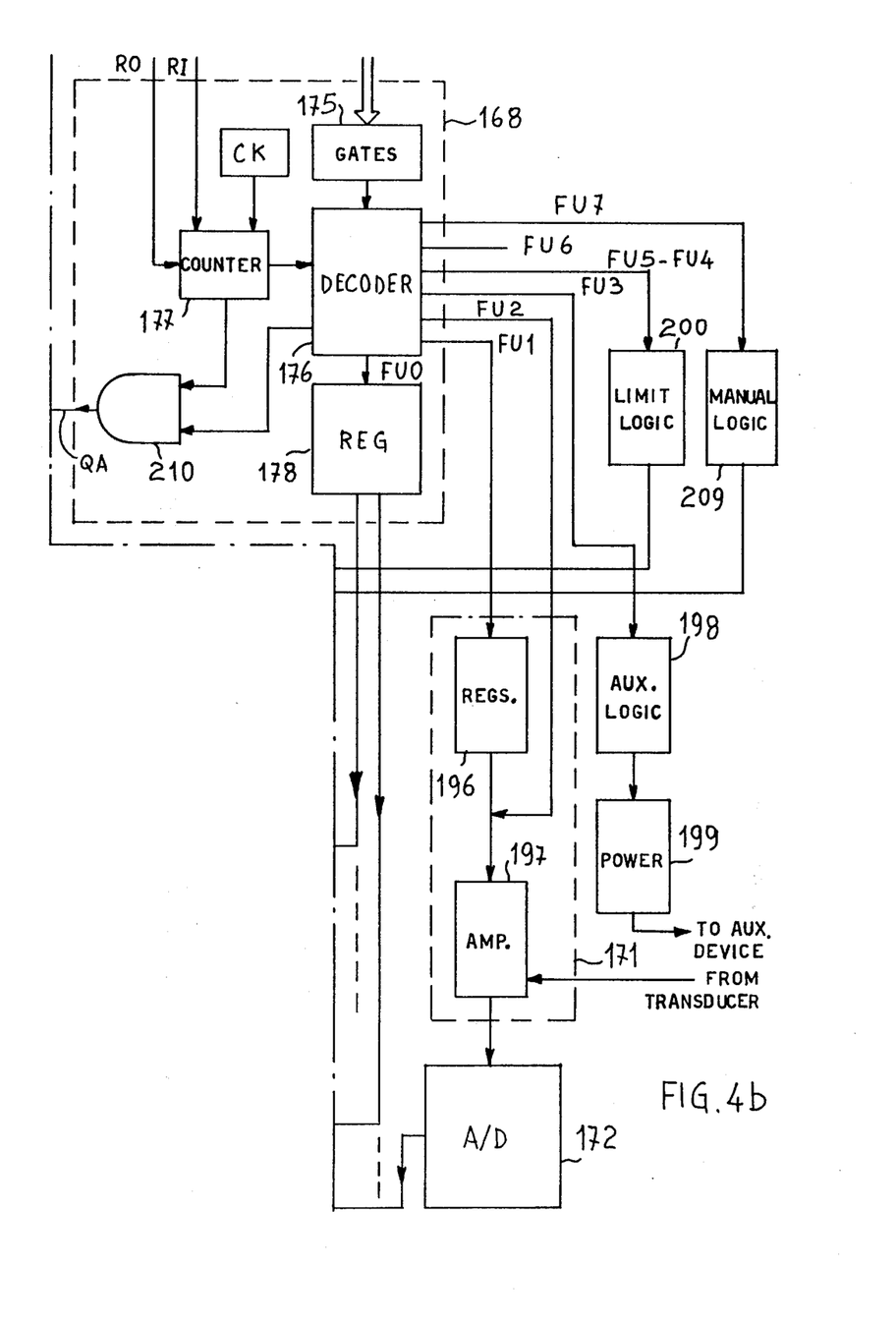

The following signal QA (FIG. 5) is sent to the buffer 170, confirming to the minicomputer 164 the acceptance of the instruction by the unit 161 and requesting from the minicomputer 164 the second instruction of the function FU0, as will be seen better hereinafter. This second instruction supplies as the bits 0-14 the number of steps that the motor addressed must carry out and the direction of rotation of this motor. This data is also stored in the register 178 (FIG. 4b). At the following instant Q4, the address stored is decoded and this decoded address selects the corresponding control circuit 169, 179 (FIG. 2).

Each motor control circuit 169 (FIG. 4a) includes a step register 181 which now stores the number of steps, already stored in the register 178, and the direction of rotation, whereby the register 178 can then accept other data. As soon as the register 181 is loaded, it emits a signal COM used to enable a pulse generator 182 feeding the motor selected. A counter 183 now counts the pulses sent by the generator 182 for feeding the motor and is adapted to compare the number of pulses emitted by the generator 182 with the number stored by the register 181. When the counter 183 reaches this stored number, on the one hand it sends a stop signal to the generator 182 and on the other hand it sends a coincidence-taken-place signal to a register 184 included in the buffer 170.

The pulse generator 182 can generate the pulses at variable frequency. In particular, a minimum frequency corresponds to the minimum speed that the respective motor can take for starting or for stopping the movement along the respective axis. This speed is calibrated in the setting-up stage, taking account of various factors (type of motor, characteristics, inertia, axis). A maximum frequency of the pulses of the generator 182, which is also pre-calibrated, corresponds to the maximum speed which can be obtained on the axis for a rapid feed or advance, through acceleration and deceleration. Between these two frequencies, intermediate frequencies can be generated in order to create a slope of acceleration or deceleration along the axis, with a gradient which is also pre-calibrated. To this end, each circuit 169 moreover comprises a comparison circuit 186 adapted to compare the number of steps stored in the register 181 with a threshold number indicative of a minimum movement below which rapid feed or advance is not necessary. If the threshold number is greater than that stored, the circuit 186 has no effect on the generator 182, which then emits the signals at the minimum frequency. If, on the other hand, the threshold number is greater, the circuit 186 emits a signal which causes the frequency of the generator 182 to increase linearly, up to the maximum frequency provided. Finally, the circuit 186 comprises a subtracter which continuously compares the number of steps of the counter 183 with the number stored in the register 181. When the difference becomes equal to the threshold number, the circuit 186 sends a deceleration command signal to the generator 182.

The pulses emitted by the generator 182 feed the respective stepping motor through a sequence circuit 187, which is conditioned by the signal indicating the direction of rotation stored in the register 181 to determine one or the other of two sequences of energization of the windings of the motor, in accordance with the half step system known per se. The sequence circuit drives a power circuit 188 which provides for amplifying the sequence signals and for limiting the current in the phases of the motor to the value required for supply in accordance with the chopper bipolar system known per se.

The control circuit 179 of each timer 180 is similar to the control circuit 169 of each motor, with the difference that it does not require variations of frequency. It includes a register 189 adapted to store the number indicating the duration and provided by the second instruction of the respective function FU0, and to emit a signal COM enabling a pulse generator 191 having a constant frequency of 5 KHz. These pulses are counted by a counter 192, which, when it accumulates a number of pulses equal to that stored in the register 189, emits a stop signal for the generator 191 and sends a coincidence-taken-place signal to the register 184.

The function FU1 indicates the selection of one of the six force transducers 97, 126 (FIG. 2). If the decoder 176 (FIG. 4b) decodes the function FU1 from the bits 11–14 of an instruction, this function is sent to the analogue-data multiplexer 171, which includes a block 196 of six registers, each associated with a corresponding transducer. The selection of the transducer is effected by setting the respective register of the block 196 on the basis of the address represented by the bits 0, 1, 2 of the instruction. The set register then enables the respective transducer for reading. To this end, an amplifying unit 197 provides for amplifying the analogue signal which is output by the selected transducer 97, 126 (FIG. 2). This signal, converted into digital form by the converter 172, is transferred to the buffer 170 to await transmission to the minicomputer 164. This transmission is effected through the medium of the buffer 170 in execution of an instruction the bits 11–14 of which are decoded by the decoder 176 as the function FU2. The address of this instruction, represented by the bits 0, 1, 2, must be equal to that of the function FU1 which has determined the reading, in order to confirm that the data required is really that which is read.

The function FU3 serves to select the auxiliarly devices, that is the autoadaptation electromagnets 49 (FIG. 2), the gripping pincers of the operating head 25, etc. If the decoder 176 decodes the function FU3 (FIG. 4) from the bits 11–14 of an instruction (FIG. 3), the respective address represented by the bits 0–8 is sent to a logic block 198 which prearranges the operation of the respective auxiliary device through a power supply block 199. The execution of the operations of the auxiliary devices is not signalled to the minicomputer 164.

The functions FU4 and FU5 serve to select the microswitches 162 and 163 (FIG. 2) and the consents, respectively, that is the limit indicators known per se, provided for eliminating erroneous mechanical operations. When the decoder 176 decodes one of the aforesaid two functions from the bits 11–14 of an instruction, it sends the address contained in the bits of smaller weight of the same instruction to a logic block 200 which enables the reading of the microswitch or the consent selected. This reading is then sent to the buffer 170.

Finally, the function FU6 serves as general reset and does not need any further illustration, while the function FU7 serves for prearrangement for autoinstruction of the system as will be seen better hereinafter.

When RI=0, while RO=1, the minicomputer 164 is ready to receive the information transmitted by the unit 161. This transmission is effected via the buffer 170 (FIG. 4a) which comprises, in addition to the register 184, a group of gates 193 which permit interfacing the signals fed to the minicomputer 164, a clock source CK which cycles continuously at a frequency of 10 KHz, an interface register 194, and a fours counter 195 commanded by a transmission sequence of the unit 161, as will be seen hereinafter. The transmission signals T0, T1, T2, T3 (FIG. 5) and the signal QB which indicates that the unit 161 is ready to transmit are then generated.

During the transmission to the minicomputer 164, the data prearranged in the register 194 is read to the minicomputer 164 and then passes to the memory RAM of the minicomputer 164. The signal QA (FIG. 5) given by a gate 210 (FIG. 4b) on reception of the function FU0 and applied to the register 194 allows the unit 161 to confirm to the computer the acceptance of the instruction FU0 received. In concomitance with the signal Q2, it calls the second part of the instruction FU0, in concomitance with the signal Q5 it enables the register 194 to receive the signals from the register 184. This register, storing the end-of-operation signals received from the counters 183 and 192, prearranges in the register 194 from time to time the request for transmission of these signals from the buffer 170 to the minicomputer 164 as soon as the latter signals its availability (RI=0).

Similarly, the signal QA (FIG. 5) given by the gate 210 on reception of the functions FU2, FU4 and FU5 prearranges the register 194 for storing the situation of the transducer, the microswitches and the consents at that instant. This situation is thus transmitted to the minicomputer 164.

From what has been seen hereinbefore, it is clear that the system functions with point by point control of the various simultaneous axes through the medium of the drives by stepping motors without position feedback, that is with open loop. The unit 161 allows the operation in parallel of all the power achieving units (motors, transducers, etc.), by replication of hardware, while the functions of control, storage, etc. inside the minicomputer are performed in series, thus relieving the minicomputer of all the tasks which require very short response times.

AUTOINSTRUCTION

The autoinstruction of the system is commanded essentially through the console 167. This comprises a selector 201 (FIG. 6) having two positions MAN and AUT. In the position AUT the selector 201 prearranges the system for automatic operation, under the control of the minicomputer 164. In the position MAN the selector 201 enables a series of manual controls of the console 167, which are adapted to send to the unit 161 signals equivalent to the corresponding instructions generated by the minicomputer 164, as seen hereinbefore. More particularly, a two-position selector 202 serves to select the left-hand or right-hand working head 25. A joystick selector 203 commands the movement along the axes X and Y of the head 25 selected by means of the selector 202. Two push-buttons 204 and 206 allow the descent and ascent, respectively, of the barrel 34 (FIG. 1) of the selected head 25. A push-button 207 allows the storage of the position of the six axes in the RAM of the minicomputer (FIG. 2). A push-button 208 (FIG. 6) serves to communicate to the minicomputer 164 the end of the autoinstruction stage and therefore of the program.

The aforesaid push-buttons and selectors serve in general for manually commanding the movement of the working heads 25. In order to command the autoinstruction, action is taken as follows. Through the medium of the teleprinter 166 (FIG. 2), the operator requests from the minicomputer 164 the function FU7 for prearranging for autoinstruction. The minicomputer 164 emits the relevant instruction which is decoded by the decoder 176, prearranging a logic block 209 (FIGS. 2 and 4b) to receive the manual commands.

Figure 6:
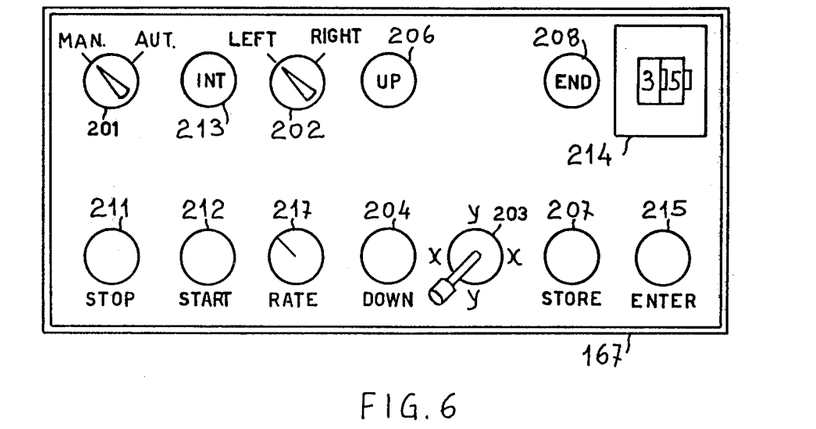
FIG. 6 is a diagram of the control console of the system of FIG. 2.

The operator now prearranges the selector 201 (FIG. 6) in the position MAN and, through the selectors 202 and 203 and the push-buttons 204 and 206, commands the movement of the heads 25 in the desired sequence. The commands act on the respective sequence circuits 187 and power circuits 188 commanding the respective motors. The same commands are applied to the register 194 of the buffer 170, whereby the minicomputer 164 can count the steps made along each axis. The desired setting having been reached, the operator presses the push-button 207 (FIG. 6). The minicomputer 164 now stores the coordinates of the point reached. All the desired operations having been performed, the push-button 208 is pressed, signalling the end of the program.

The console 167 moreover comprises the following additional controls which can complete control of the working centre by the minicomputer 164. A push-button 211 serves to interrupt the operation of the unit 161 instantaneously in cases of emergency. Since the stepping motors operate without feedback control, it is then necessary to recommence operation from the beginning. A start push-button 212 is adapted to start the execution of a working or machining cycle with the selector 201 in the position AUT. An interruption push-button 213 serves to condition the minicomputer 164 to stop the cycle at the end of an instruction which is being executed without losing information. An interrupt procedure is then carried out in the conversation between the minicomputer 164 and the unit 161. In order to resume the cycle, the push-button 212 is actuated again.

The console 167 is moreover provided with an entry device 214 adapted to enter numerical values with two decimal digits. By pressing a push-button 215 after entering the desired number on the entry device 214, a logic block 216 (FIG. 4) is enabled to read the value of the entry device 214 and to store it in the register 194 at the disposal of the minicomputer 164. This datum may assume from time to time the significance of a travel along an axis or of the address of an auxiliary device. The significance is defined by the minicomputer 164, which is able to stop at a predetermined point of the cycle to ask the operator for variable data or additional information.

Finally, the console 167 comprises a potentiometer 217 (FIG. 6) for setting the feed rate of a cutting tool, for example a drilling bit.

PROGRAMMING OF THE WORKING CENTRE

From what has been seen hereinbefore it is apparent that from a logical point of view, the hardware unit 161 (FIG. 2) behaves in a transparent manner with respect to the minicomputer 164, since any information coming from or directed to the working centre is not processed by the unit 161, but is transmitted by the minicomputer to the working centre and vice versa. The minicomputer 164 is able to execute complex programs composed of numerous sub-programs or sub-routines. These are defined in synthetic manner by a language formed of some tens of specific instructions, each enterable through the teleprinter 166 by means of mnemonic symbols or labels. Each symbol or label is constituted by a pair of letters of the alphabet, which are followed by one or more parameters in accordance with the formula KW/Parameter, where KW is the mnemonic symbol.

This language allows the linking of the various sub-routines to form a more complex routine and the calling of possible routines already recorded by means of a single address or a label. The language moreover allows the independent programming of each working head at different times.

The work of the two heads 25 is then correlated logically and in time only at the moment of execution, under the control of suitable instructions provided in the language. In other words, the minicomputer handles the mutual positions of the two operating heads 25 in a dynamic manner so as always to avoid any collision.

The following instructions serve to superintend the various functions of the system (job control) and can be called by a very simple procedure through the teleprinter.

MD = Memory available: serves to obtain the printout of the memory still available for programming;

IN = Instruction: serves to prearrange the system for instruction, that is for recording of one or more routines;

LI = List: serves to request the minicomputer to list the programmed instructions on the teleprinter;

DU = Dump: commands the punching of the programmed instructions on tape;

ST = Store: commands the recording in the RAM of the program punched on the tape;

MA = Manual: serves to execute a working cycle composed of a plurality of routines, the name of which constitutes the parameter of the instruction; at the end of execution, the teleprinter 166 (FIG. 2) must be actuated to initiate a fresh cycle;

SA = Semi-automatic: this is similar to the instruction MA, but at the end of execution a start is made again with the start push-button 212 (FIG. 6) of the console 167;

AU = Automatic: serves to execute cycles repeatedly without the intervention of the teleprinter, which may then be switched off.

After the calling of the instruction IN - instruction, the system is enabled to receive the true and proper programming instructions, which may be grouped as follows, according to the function commanded by them:

ACTUATION INSTRUCTIONS

These are the instructions which produce immediately a response of the working centre.

OR = Origin: serves for zeroizing the axes of the two operating heads and possibly the rotary tables indicated by the parameter;

MO = Movement: permits the command of movement of the axes indicated by the parameter;

AX = Auxiliaries: commands the auxiliaries indicated by the parameter;

HL = Hold: commands the arrest of the working head on which it is programmed; the head starts again by pressing the start push-button 212 of the console 167;

WA = Wait: commands the arrest of the operating head on which it is programmed for a time indicated by the parameter, for example in order to allow the actuation of an auxiliary after the command has been given.

SEQUENCES CONTROL INSTRUCTIONS

These are the instructions which carry out comparisons, take logical decisions and govern the order of execution of the instructions.

NU = Number: creates a label or jump address indicated by the parameter, thus allowing the linking of a plurality of instructions of a routine;

JU = Jump: commands an unconditional jump to the address indicated by the following instruction NU;

BL, BE, BG = Branch if less, equal, greater: command a jump conditioned by the comparison of two parameters or of a parameter with a counter;

EX = Execution: enables a routine prearranged by the programmer and indicated by the parameter to be called, inserting therein the specific data indicated in the parameter itself.

CORRELATION INSTRUCTIONS

These allow the movement of the two operating heads to be correlated.

KO = Coordination: serves to coordinate the operation of one working head with that of the other working head, fixing meetings or rendezvous between them during the execution of these operations;

LB = Coordination label: serves to give the address of a coordination instruction KO; therefore, to an instruction LB on one working head there corresponds an instruction KO on the other working head, which is then arrested until the function LB is executed on the first head;

QA = Anti-collision setting: serves to store the dimensions of the two working heads which are indicated by the parameter and indicates the maximum travel that a head can perform along the axis X with the other head in the zero position without impact taking place between the two heads; the dynamic use of a variable anti-collision setting or quantity can permit savings of time by allowing in certain cases the starting of a head without waiting for the other head to reach the final position in that stage; the parameter moreover indicates which of the two working heads has precedence in movement, when a mutual distance less than this anti-collision setting is sensed.

GEOMETRICAL REFERENCE INSTRUCTIONS

These allow the geometrical definition of the movements of the working heads.

RI = Reference: allows new reference systems to be defined, for example the zero coordinates of a piece of equipment with respect to the machine zero, thus simplifying the entire programming relating to the equipment;

II = Incremental beginning: allows the execution and the storage in incremental value of all the movement instructions given to the motors after this instruction;

IF = Incremental end: allows the execution in absolute value of the movement instructions and cancels the instruction II.

INSTRUCTIONS FOR INTERROGATION OF EXTERNAL CONDITIONS

These supply information on external signals of consent to the continuation of execution.

RP = Wall search: causes an operating head to move along an axis until it encounters a wall and causes the execution of the cycle to be continued from a certain stage or another according to whether the wall has been found or not; the presence of the wall is signalled by the transducers 97 and 126 (FIG. 2);

RF = Hole search: causes an operating head to move along a predetermined path, for example along a spiral, for the purpose of searching for a hole in a workpiece;

CF = Comparison: the position reached by an operating head, on the basis of the drives effected by the stepping motors, is compared by the minicomputer with the provided position;

PP = Presence of workpiece: enables the sensing of an external signal (usually a microswitch); the cycle continues automatically if the desired condition occurs, in the opposite event it jumps to the address indicated by the parameter.

From what has been described above it is clear, for example, that the wall search instruction allows the minicomputer to cause the sequence to be continued as a function of the result of the respective operation.

EDIT INSTRUCTIONS

These allow the correction of instructions already programmed.

RE = Replace: allows all the instructions comprised between two instructions indicated in the parameter to be replaced by fresh instructions entered on the teleprinter;

PL = Place: allows one or more fresh instructions to be inserted before the instruction indicated in the parameter;

DE = Delete: allows all the instructions comprised between two instructions indicated by the parameter to be cancelled.

INSTRUCTIONS TYPICAL OF PARTICULAR APPLICATIONS

These serve for the specific commands of particular devices. They do not require special descriptions, for which reason they are only listed here.

SP = Entry of speed of rotation of the spindle of the drill;

MN = Command of the rotation of the spindle;

FR = Feed rate (entry of the feed rate of the spindle);

TR = Rotation of the tool table for bringing the desired tool always into the same removal zone;

RB = Riveting: causes a complete riveting cycle to be executed.

EXAMPLE OF OPERATION

Figure 7:
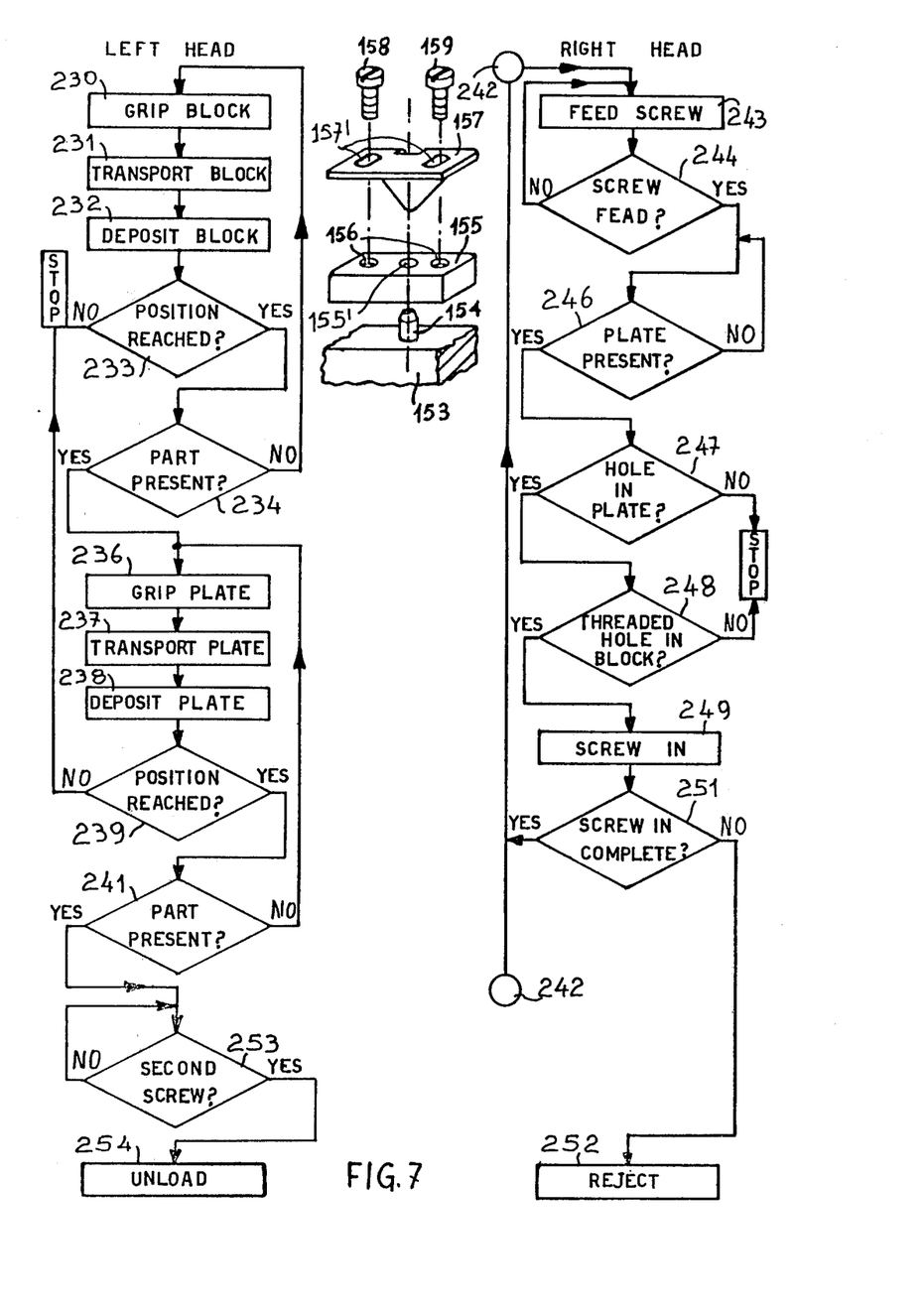
FIG. 7 is a flow diagram for the execution of a working program.

In FIG. 7 there is illustrated in the form of a flow diagram the complete sequence for the assembly of a group or unit which requires the use of the two working heads 25. The left-hand working head 25 is equipped with gripping pincers, the right-hand working head is equipped with a screwdriver provided with an automatic loading device for the screws. The operation consists in arranging by means of the left-hand head 25, on a part 153 which has a locating pin 154, a block 155 having a hole 155' for the pin and two threaded holes 156 and, on the block 155, a plate 157 having two holes 157'. It is necessary to screw two screws 158 and 159 into the block 155 through the plate by means of the right-hand head 25.

For the left-hand operation head 25, the program begins with a block gripping operation, indicated by the reference 230, which is executed under the control of an instruction MO for permitting the command of movement of the axes to reach the position of the magazine of the blocks 155, an instruction RP for causing the operating head 25 to move along an axis until the first block 155 is encountered, and an instruction AX for the block gripping command. There follows an operation 231 of transport of the block 155 in execution of another instruction MO for reaching the position of the part 153. Then, an operation 232 of deposit of the block 155 is effected, in execution of an instruction RF for centering the pin 154 with the hole 155' of the block.

On the basis of the signal of the transducer 97 (FIG. 2), the unit 161 allows the minicomputer 164 to effect a logical operation 233 in execution of a comparison instruction CF for establishing whether the final position provided has been reached with the working head. If the answer is no, the working centre stops and the operator has to determine the cause of the stoppage. If the answer is yes, on the basis of the reading of sensing elements the minicomputer 164 executes a presence of part or workpiece instruction PP (logical operation 234) to establish whether the block 155 has actually been positioned on the part 153. If the result of this operation is negative, the program executes a jump instruction JU and recommences from the beginning.

If, on the other hand, this result is positive, an operation 236 of gripping of the plate 157 is initiated, followed by a transport operation 237, a deposit operation 238 and a position-reached operation 239, these operations being similar to the operations 230, 231, 232 and 233. Now also, if the final position has not been reached, the working centre stops, while if it is reached a presence of part operation 241 is effected in execution of an instruction PP in order to ascertain whether the plate 157 has been positioned. If the result of this check is negative, a jump is made to operation 236 and the operation on the plate 157 is repeated. If, on the other hand, the result of the check is positive, an operation of coordination with the program of the right-hand working head 25 is effected in execution of an instruction LB for the left-hand head 25, which stops temporarily, and of an instruction KO on the right-hand head 25 (point 242 of the diagram of FIG. 7).

The program of the right-hand head 25 is entered independently of that of the left-hand head 25 and begins with the instruction KO. This instruction also causes the minicomputer 164 to take into consideration the dimensions of the two working heads 25 by means of the QA instruction which prevents any collision of the two heads 25 during simultaneous movements thereof. There follows a screw gripping operation in execution of instructions MO, RR and AX for producing the feed of the screw 158 (operation 243). An operation 244 of checking of the preceding operation follows and if the result thereof is negative the operation 243 is repeated. If, on the other hand, the result of the operation 244 is positive, a testing 246 of the situation of the program of the left-hand head 25 is effected to establish whether the plate 157 has been deposited. If this plate should not yet have been deposited, the testing 246 is repeated until the result of this operation is positive, thus further coordinating the execution of two programs.

When the presence of the plate 157 is sensed in this way, it is established by the minicomputer 164, by means of two successive testing operations 247 and 248 controlled by two consecutive instructions RF, whether there is a hole 157' in the angle plate 157 and whether there is a threaded hole 156 in the block 155, respectively. If the result of one of these tests is negative, the working centre stops and the operator searches for the cause of the stoppage. If, on the other hand, the result is positive, after the testing operation the operation 249 of screwing in the screw 158 is initiated in execution of an instruction MN. The minicomputer now determines by a test 251 whether the screwing in has been completed, by the methods depicted in FIG. 7 of the copending United States patent application Ser. No. 717,945 filed on Aug. 26, 1976, now U.S. Pat. No. 4,092,719. If the result of this test is negative, the unloading of the rejected part is effected (operation 252)

by means of the execution of an instruction AX which commands a loading arm known per se.

If, on the other hand, the result of the test is positive, the routine is repeated from the point 242 to the test 251 for the second screw 159. In the meantime, after signalling the presence of the plate 157, the left-hand head 25 has initiated the signalling of the possible presence of the second screw 159 under the control of an instruction PP (operation 253). Until this screw 159 is present, the testing is repeated continuously. When, on the other hand, the presence of the screw 159 is sensed, and in concomitance with the screwing-in-completed signal (operation 251), there is commanded by an instruction AX the gripping of the finished assembled unit and by an instruction MO the transport and unloading of this unit (operation 254).

It is therefore clear that the instruction of coordination between the two working heads avoids the pincers of the left-hand head 25 unloading the unit before the right-hand head has terminated the screwing-in operations. Moreover, it would not otherwise be possible to ensure the synchronism of the operations of the two heads, because of the rescue recycles in those cases in which the required situation is not verified.

What I claim is:

1. In an autoadaptive working center for programmable automation having at least one operating head for performing work on a workpiece, servomotor means for moving said operating head along a predetermined path in at least two coordinates, a central processing unit comprising a program unit for storing the working center program and a processing unit for executing the working center program, said program unit additionally storing position data for defining the path of said operating head and process data for defining the operations to be performed by said operating head at predetermined points along the path of said operating head, and a control unit responsive to the position and process data in said program unit for controlling the operation of said servomotor means, wherein the improvement comprises:
   a plurality of transducers mounted on said operating head for sensing external operating conditions of said operating head and generating signals representative of these external operating conditions;
   selection means responsive to said program unit for selecting at least a particular one of said plurality of transducers;
   transmitting means connected to said plurality of transducers and responsive to said selection means for transmitting the signal representative of the external operation condition sensed by said particular one of said plurality of transducers to said central processing unit, wherein said processing unit further comprises addressing means connected to said transmitting means for generating addresses corresponding to the signals representative of the external operating conditions, said addressing means being connected to said program unit for addressing the next subroutine stored in said program unit in accordance with the signal transmitted by said transmitting means to said central processing unit.

2. A working center according to claim 1, wherein said particular one of said plurality of transducers enables said addressing means to address a wall search instruction stored in said program unit for causing said processing unit to move said operating head along an axis under the control of said particular one of said plurality of transducers until a wall is encountered.

3. A working center according to claim 1, wherein said particular one of said plurality of transducers enables said addressing means to address said processing unit to automatically continue the program according to whether said particular one of said plurality of transducers senses the presence of the workpiece.

4. A working center according to claim 1 further comprising:
   at least one additional operating head, each one of said operating heads being independently controlled by a different program stored in said program unit; and
   coordinating means in said processing unit responsive to correlation instructions stored in said program unit for correlating the movements of said operating heads with each other, wherein particular ones of said plurality of transducers selected by said selection means enable said addressing means to address one of the correlation instructions stored in said program unit according to the external operating conditions sensed by said particular ones of said plurality of transducers.

5. A working center according to claim 4, wherein the particular ones of said plurality of transducers enable said addressing means to address a coordination label instruction stored in said program unit to thereby enable said coordinating means to arrest the movement of one of said operating heads until the end of the execution of a coordination label instruction on another one of said operating heads.

6. A working center according to claim 4, wherein the particular ones of said plurality of transducers selected by said selection means enable said addressing means to address an anti-collision setting instruction stored in said program unit which defines the dimensions of the two devices to thereby enable said coordinating means to arrest the movement of one of said operating heads if during their simultaneous movement the distance between the said operating heads is smaller than a predetermined anti-collision setting.

7. A working center according to claim 1, wherein said program unit comprises:
   a minicomputer which includes a random access read/write memory and a data transmission terminal for calling from said memory the routines required from time to time; and
   an input unit for recording a given program from time to time in said memory, said input unit being conditionable for co-operating with said minicomputer in accordance with procedures of conversation between said central processing unit and said data transmission terminal, wherein said input unit modifies the recorded routines and completes the data necessary for the working process as required by said minicomputer.

8. A working center according to claim 7 wherein said minicomputer is responsive to a permanent recording instruction stored therein for allowing said minicomputer to record on a permanent carrier the program recorded in said random access memory, said input unit comprising means for entering sequence control instructions to connect various subroutines with one another so that they can be recorded together and can be called in sequence by means of a single address.

9. In an autoadaptive working center for programmable automation having at least one operating head for performing work on a workpiece, servomotor means including a plurality of stepping motors for moving said operating head along a predetermined path in at least two coordinates, and a central processing unit comprising a program unit for storing the working center program and a processing unit for executing the working center program, said program unit additionally storing position data for defining the path of said operating heads and process data for defining the operations to be performed by said operating head, wherein the improvement comprises:

a plurality of transducers mounted on said operating head for sensing external operating conditions of said operating head and generating signals representative of these external operating conditions; and     a pair of numerical control units associated with the coordinates of said operating head for controlling the movement of said operating head along the coordinates in response to the position and process data in said program unit, said pair of numerical control units being coupled to said processing unit for supplying corresponding ones of said plurality of stepping motors in said servomotor means with a number of electric pulses proportional to the travel to be carried out, said processing unit in said central processing unit comprising a decoder for decoding both the instructions stored in said program unit and the addresses of said plurality of stepping motors and a buffer for transmission of data to said program unit, wherein said pair of numerical control units, said stepping motors and said plurality of transducers are connected in parallel to said decoder and said buffer.

10. A working center according to claim 9, wherein each of said pair of numerical control units comprises:

a register for temporarily storing the number of electric pulses to be supplied to the corresponding stepping motor;

a pulse generator for supplying the electric pulses to said corresponding stepping motor;

comparing means connected to said register and said pulse generator for comparing the number of electric pulses supplied to said corresponding stepping motor with the required number of electric pulses, said comparing means being connected to said program unit for supplying the result of the comparison to said program unit;

and a sequence circuit connected to said pulse generator and to said stepping motor for causing said corresponding stepping motor to rotate in a selected direction, wherein said decoder in said processing unit conditions said sequence circuit upon decoding instructions stored in said program unit.

11. In an autoadaptive working center for programmable automation having at least one operating head for performing work on a workpiece, servomotor means for moving said operating head along a predetermined path in at least two coordinates, a central processing unit comprising a program unit for storing the working center program and a processing unit for executing the working center program, said program unit additionally storing position data for defining the path of said operating head and process data for defining the operations to be performed by said operating head at predetermined points along the path of said operating head, and a control unit responsive to the position and process data in said program unit for controlling the operation of said servomotor means, wherein the improvement comprises manual control means for enabling the operator of the working center to exercise manual control, said manual control means comprising:

operator means connected to said processing unit for manually operating said at least one operating head;

generating means connected to said operator means for generating data and instructions corresponding to the manual operation of said at least one operating head;

recording means connected to said generating means for recording in said program unit the instructions corresponding to the manual operation of said at least one operating head;

manual addressing means for addressing a teaching instruction stored in said program unit for predisposing said central processing unit to respond to the manual operation of said at least one operating head in order to cause said recording means to record the instructions and data generated by said generating means.

12. A working center according to claim 11, wherein said operator means comprises switch means for prearranging manual control of the operation of said working center and selection means for selecting said at least one operating head to be moved; wherein said servomotor means comprises stepping motors, each one provided for commanding the movement of said at least one operating head along a corresponding coordinate; and wherein said recording means includes a buffer conditionable for transmitting the number of steps to be carried out by each stepping motor to said program unit, actuating means for actuating said recording means and conditioning means for conditioning said buffer.

13. A working center according to claim 12, wherein said operator means includes a lever for commanding the movement of each operating head along at least two coordinates.

* * * * *